Feb. 27, 1962     P. C. JOHN ET AL     3,022,870
ADHERENT SEALER FILM
Filed March 18, 1957
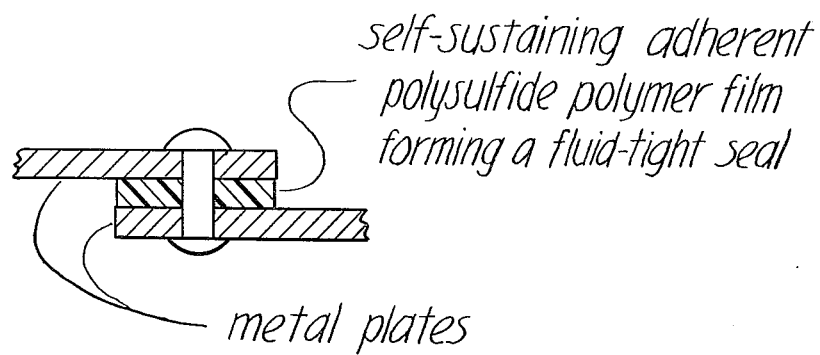
INVENTORS
PAUL C. JOHN
RICHARD R. PETTIT
by Carpenter, Abbott, Coulter & Kinney
ATTORNEYS

United States Patent Office
3,022,870
Patented Feb. 27, 1962

3,022,870
ADHERENT SEALER FILM
Paul C. John, Glendale, and Richard R. Pettit, La Habra, Calif., assignors to Minnesota Mining and Manufacturing Company, St. Paul, Minn., a corporation of Delaware
Filed Mar. 18, 1957, Ser. No. 646,855
13 Claims. (Cl. 189—36)

This invention relates to adherent polymeric films or strips useful for sealing riveted metal seams against fluid penetration. While not limited thereto, an important aspect of the invention relates to thin self-sustaining films or strips having a polysulfide polymer base, which are adherent to clean aluminum surfaces and are highly resistant to organic solvents and water, and which are therefore particularly useful for sealing the seams of wing tanks in all-metal aircraft. The invention also provides methods of making the novel films, as well as improved leak-proof structures embodying such materials.

A preferred embodiment of the invention is illustrated in the accompanying drawings, showing in cross-section a thin strip of self-sustaining adherent polymeric film forming an adherent fluid-tight seal between faying surfaces of a riveted metal-to-metal seam or joint.

Caulking of metal-to-metal seams with sealer compositions in the form of adherent self-hardening pastes or liquids produces an effective seal but is inconvenient and causes a number of difficulties. Accurate placement of the composition in minimum effective amount is difficult to achieve. The entire batch must be applied prior to completion of the hardening action. If placed on faying surfaces which are later riveted or otherwise forced together, the sealer may be squeezed from the seam and its utility destroyed; or, more importantly, the sealer may cure to a non-conforming state before the sections can be combined. Difficultly accessible seams are therefore often inadequately sealed when liquid or paste compositions are used.

Attempts have been made, prior to the present invention, to provide sealer materials in film or tape form. Paste-like materials supported on porous fabrics are untidy in application, and the paste material squeezes from the seam and picks up dirt and debris. The permanently soft paste lubricates and reduces the strength of the seam, and eventually may be squeezed from the seam by continued flexing. Firm plastic films, on the other hand, do not make adequate contact with the faying surfaces and do not provide a fully effective sealer; and such films are difficult to retain in place prior to riveting. Other prior art gasket and sealer materials have been found in practice to have still other deficiencies, particularly in the sealing of riveted metal-to-metal seams in aircraft.

The present invention provides a film product which can be wound into roll form for convenience in storing, shipping and handling. When unwound from the roll and separated from its protective liner, the film is self-sustaining and can be applied in long continuous sections without breakage or other inconvenience. It does not adhere to the fingers, nor indeed to most materials on temporary contact, but is found to adhere to clean aluminum as well as many other surfaces when held briefly in contact therewith. The film is easily stretched and broken by hand pulling when desired, and may also be cut into desired shapes where necessary. Although seemingly soft and weak when manipulated in the fingers, the film is found to exhibit surprising strength when incorporated in a metal-to-metal seam. It adheres to the metal surfaces, forms a continuous sealing layer therebetween, and effectively prevents passage of air and liquids; for example, such a seam is completely effective in a pressurized airplane cabin under differential air pressures well in excess of 15 lbs. per square inch, and in an airplane wing tank containing aviation fuels. The film also resists other and still more active solvent liquids including ester type hydraulic fluids as used in aircraft. It remains flexible and maintains an effective seal at extremely low temperatures, and retains ample strength at far above normal room temperatures. Extremely thin films are fully effective in aircraft applications and offer significant advantages with respect to reduction of weight in aircraft construction.

A preferred formulation is based on a liquid polysulfide polymer such as "Thiokol LP" polymers, i.e. liquid polymers formed by the controlled depolymerization, by reductive cleavage of disulfide groups, of polymers of organic dihalides and sodium disulfide with small amounts of trifunctional cross-linking agents. As a preferred example, 98 mol percent of dichloroethyl formal and 2% of trichloropropane are condensed with sodium polysulfide, with elimination of sodium chloride, and the resulting polymer subjected to reductive cleavage of disulfide groups to yield liquid polysulfide polymers having thiol terminals and molecular weights of the order of about 1000–5000. "Thiokol LP–2," for example, is made substantially as just indicated and has a molecular weight of about 4000. "Thiokol LP–32" is made to approximately the same molecular weight but about 0.5% rather than 2–2½% of the trifunctional cross-linking component is used in making this polymer. These polymers are known to cure to flexible solids by reaction with lead peroxide, the cured product being a rubbery material completely devoid of adhesive qualities and resistant to many solvents, although ineffective against mercaptans. In the product of the present invention, the undesirable excessive weight of the lead peroxide curing agent is eliminated, and the rubbery cured composition is highly resistant to attack by solvents including mercaptans and is also rendered adherent to metals and other surfaces, as already indicated.

A specific illustrative but non-limitative example will now be provided.

*Example*

| | Parts by weight |
|---|---|
| Liquid polysulfide polymer ("Thiokol LP–32") | 100 |
| Maleic anhydride solution (50% methylethyl ketone) | 1.1 |
| Benzyl dimethylamine | 1.1 |
| Esterified silica powder ("Valron Estersil") | 8 |
| Pigment (Titanium dioxide, "Unitane O–220") | 2 |

The above composition is blended on a paint mill to a homogeneous paste, and to this paste is added cumene hydroperoxide curing agent in the proportion of 6 parts of the latter to 100 parts of the paste. Small amounts of inert filler such as fine silica powder may be added to the cumene hydroperoxide if desired, for convenience in handling; a mixture of 100 parts cumene hydroperoxide with 6 parts "Cab-o-sil" silica powder is preferred. The resulting heavy viscous mixture is placed between two sheets of polyethylene film and the composite is drawn between pressure bars set at an opening sufficient to provide a thickness of the paste layer of approximately 10–12 mils. The composite is permitted to stand at room temperature for at least about 4 hours, and is then cut into sheets or slit into narrow strips for subsequent packaging and use.

The above-described mixture cures in about 2 hours to a non-spreadable state, and the entire batch is therefore spread out between the polyethylene film slipsheets within somewhat less than that time. The viscosity and the gelatinous nature of the composition, while permitting the formation of thin films by the procedures indicated, effectively prevent further flow of the material during subsequent handling, and particularly since the composition rapidly cures to an effectively non-plastic state. Curing is completed within about 12 hours at normal room temperature, or somewhat shorter periods at slightly elevated temperatures, but temperatures higher than about 120° F. produce a somewhat softer cure and introduce the possibility of loss of unreacted volatile component.

The film produced as just described is found to be strongly adherent to glass and only slightly less adherent to clean aluminum. It may be removed from one of the protective polyethylene films and adhered to a metal surface under slight finger pressure, and the remaining polyethylene film may then be stripped away from the exposed surface without breaking the adhesive bond to the metal. When a second metal sheet is placed over the film and the composite permitted to stand, the adhesion to the metal surfaces gradually increases and the seal thus gradually improves. When the two layers of metal are riveted together, as indicated in the accompanying drawing, or otherwise mechanically combined, as by bolting, permanently clamping, etc., the intervening film not only adheres firmly to the opposing metal surface, but also deforms sufficiently to fill completely all irregularities of or between the two surfaces, while effectively resisting the forces, set up by riveting or flexing of the seam, tending to squeeze the sealer from the seam area.

Increasing the amount of maleic anhydride in the above formula is found to increase the viscosity and to reduce the pot life of the composition while at the same time increasing the ability of the cured film to adhere to metal and other surfaces. The reverse effect is obtained as the proportion of maleic anhydride is reduced. For most effective application of the film at the speed necessitated by commercial operations, the amount of maleic anhydride is preferably approximately as indicated. For somewhat less critical conditions the amount of this material may be within the range of about 0.2–1.5 parts. Compositions containing no maleic anhydride or equivalent are still found to attain excellent adhesion to aluminum when left in contact therewith for at least several months, but these compositions obviously are less desirable for the usual commercial applications. Likewise, still higher proportions of such materials may be used in compositions employing higher proportions of pigments, or less reactive amines, or other variations.

In place of maleic anhydride, other equivalent adhesion-imparting acidic materials such as dichloromaleic anhydride and itaconic anhydride may be used, although somewhat higher proportions by weight are required for these specific compounds.

The cumene hydroperoxide component acts as a curing agent for the polysulfide polymer. It, or equivalent organic peroxide curing agent such as tertiary butyl hydroperoxide or methyl ethyl ketone peroxide, normally requires activation; and the benzyl dimethylamine serves this latter function. Other amine activators, e.g. dimethylamino ethanol, and commercial amine activators such as "DMP–30," are also useful. While the amounts of these materials may vary somewhat from the proportions indicated in the specific example, the extent of cure there provided is found to be highly satisfactory where the resulting film material is to be employed in the sealing of metal seams in aircraft as hereinbefore described. Too low a cure results in a soft plastic film which in a riveted metal-to-metal seam, e.g. in an aircraft cabin, does not adequately prohibit leakage of air at 5–15 p.s.i. differential. An excessive cure, on the other hand, reduces the adhesive properties of the film to a degree which makes it difficult to apply in commercial sealing operations, e.g. in the assembling of aircraft.

The esterified silica powder is effective in increasing the viscosity and gelatinous nature of the uncured composition, and is therefore of considerable assistance and importance in the production of thin films of uniform thickness. This component also appears to influence the ability of the cured film product to resist excessive flow under continued pressures, and therefore to resist flowout from seams and joints on long standing and under pressure differential. The specific material defined in the example is understood to be the product of the reaction with an alcohol of a heat activated supercolloidal silica having a high proportion of surface silanol groups. The surface of the particles is rendered organophilic by such treatment. Other effective reinforcing pigments, and particularly those having an organophilic surface, may be substituted in whole or in part for such esterified silica powder. The amounts of such materials may also be varied, smaller amounts providing for reduced viscosity but increased ease of film formation, and larger amounts providing for reduced flow, particularly at elevated temperatures. The reinforcing powder is not essential and may be omitted, particularly in extremely thin film products.

By substitution or addition of suitable pigments, the film may be produced in any desired color. Thus, the titanium dioxide of the example produces a white film; but carbon black, or iron oxide, or phthalocyanine pigments may be substituted or added to provide black, or red, or green, or other colors as desired.

These films have been produced in thicknesses as low as about 3 mils and as high as 30 mils or more. The thinner films are more readily produced either by reducing the amount of reinforcing pigment, as hereinbefore noted, or by temporarily reducing the viscosity of the composition either by the addition of small proportions of volatile solvents such as toluene or in other ways. The addition of a volatile solvent of course requires that it be subsequently removed by evaporation, and hence this method is ordinarily less desirable. For application in aircraft sealing, the thinner films are desired, since they add less to the weight of the aircraft; but for other applications the thickness may be increased as much as found desirable. Thinner films of the composition of the present invention may also be combined with thicker films of other materials, for example to impart surface adhesion properties to non-tacky cured polysulfide polymer film or other material.

The film products of this invention may be produced by coating the self-curing paste-like mass described in the example on a suitable removable carrier such as polyethylene film or polyethylene-coated paper, and permitting the coating to cure while in exposed position. The procedure is particularly useful where the composition contains volatile solvent which must be removed, but requires extra precautions in handling the film during the cure period. Once the cure is completed, the composite sheet may be cut into suitable widths and wound into rolls for storage, the adherent sealer film thereby being protected on both surfaces with the removable polyethylene slipsheet. The same roll structure is equally easily obtained by removing one of the slipsheet layers from the cured film of the specific example prior to winding the film, with its remaining protective layer, into roll form.

What is claimed is as follows:

1. The method of making a thin polymeric film product capable of forming an adherent, solvent-resistant and pressure-resistant seal when inserted between faying surfaces in making a riveted seam between metal panels, comprising: spreading in a thin uniform layer on a removable slipsheet a self-curing mass containing liquid polyalkylene polysulfide polymer having thiol terminals, maleic anhydride, organic peroxide curing agent, and organic amine activator; and then curing said layer while maintaining its uniform thickness.

2. The method of making a thin polymeric film product capable of forming an adherent, solvent-resistant and pressure-resistant seal when inserted between faying surfaces in making a riveted seam between metal panels, comprising: spreading in a thin uniform layer on a removable slipsheet a self-curing paste-like plastic mass consisting essentially of liquid polyalkylene polysulfide polymer having thiol terminals, maleic anhydride, esterified silica powder reinforcing filler, organic peroxide curing agent, and organic amine activator; and then curing said layer.

3. A thin adherent rubbery film product capable of forming an adherent, solvent-resistant and pressure-resistant seal when inserted between faying surfaces in making riveted seam between metal panels, comprising the rubbery, adherent, solvent-resistant, cured product in thin film form of a self-curing mass containing liquid polyalkylene polysulfide polymer having thiol terminals, maleic anhydride, organic peroxide curing agent, and organic amine activator.

4. A thin adherent rubbery film product capable of forming an adherent, solvent-resistant and pressure-resistant seal when inserted between faying surfaces in making a riveted seam between metal panels, comprising the rubbery, adherent, solvent-resistant, cured product in thin film form of a self-curing paste-like plastic mass consisting essentially of liquid polyalkylene polysulfide polymer having thiol terminals, maleic anhydride, esterified silica powder reinforcing filler, organic peroxide curing agent, and organic amine activator.

5. An article having a leak-proof, mechanically held, metal-to-metal seam, comprising metal faying surfaces held in position by external mechanical retaining means and separated by an intervening thin film conformed and adhered to each of said faying surfaces and being a rubbery, adherent, solvent-resistant, cured product in thin film form of a self-curing mass containing liquid polyalkylene polysulfide polymer having thiol terminals, maleic anhydride, organic peroxide curing agent, and organic amine activator.

6. An article having a leak-proof, mechanically held, metal-to-metal seam, comprising metal faying surfaces held in position by external mechanical retaining means and separated by an intervening thin film conformed and adhered to each of said faying surfaces and being a rubbery, adherent, solvent-resistant, cured product in thin film form of a self-curing paste-like plastic mass consisting essentially of liquid polyalkylene polysulfide polymer having thiol terminals, maleic anhydride, esterified silica powder reinforcing filler, organic peroxide curing agent, and organic amine activator.

7. The method of making a thin polymeric film product capable of forming an adherent, solvent-resistant and pressure-resistant seal when inserted between faying surfaces in making a riveted seal between metal panels, comprising: placing between smooth surfaced flexible removable slipsheets a self-curing paste-like plastic mass containing liquid polyalkylene polysulfide polymer having thiol terminals, maleic anhydride, organic peroxide curing agent, and organic amine activator; forming the mass into a thin uniform layer between the slipsheets; and then curing said layer.

8. In combination, an adherent sealer film in elongate strip form removably attached to a protective slipsheet and capable on removal therefrom of forming an adherent, solvent-resistant and pressure-resistant seal when inserted between faying surfaces in making a riveted seam between aluminum panels, said film being the rubbery, adherent, solvent-resistant, cured product of a self-curing plastic mass comprising 100 parts by weight of liquid polyalkylene polysulfide polymer having thiol terminals, maleic anhydride in an amount sufficient to promote immediate bonding to metal without unduly reducing the pot life of the plastic mass and within the range of about 0.2–1.5 parts by weight, an organic peroxide curing agent for said polymer, and an organic tertiary amine activator; said peroxide and said amine being present in amounts sufficient to provide curing of said plastic mass to a strong flow-resistant state while still retaining effective adhesion to aluminum as exemplified by the cure obtained at room temperature with approximately 6 parts of cumene hydroperoxide and 1.1 parts of benzyl dimethylamine in the presence, in the said mass, of 8 parts of esterified silica powder and 2 parts of titanium dioxide pigment.

9. A structure comprising the rubbery, adherent, solvent-resistant, thin elongate film strip material of claim 8 adherently bonded on at least one surface to the clean surface of a thin aluminum sheet material.

10. The method of making a thin polymeric film product capable of forming an adherent, solvent-resistant and pressure-resistant seal when inserted between faying surfaces in making a riveted seam between metal panels, comprising: blending together, as a heavy viscous self-curing plastic mass, ingredients consisting essentially of liquid polyalkylene polysulfide polymer having thiol terminals, maleic anhydride, organic peroxide curing agent for said polymer, and organic amine activator; plastically deforming said mass into a thin uniform layer on a temporary supporting member; and retaining said layer on said member while permitting said layer to cure at not higher than about 120° F.

11. In combination, a permanently flexible, tough, strong, adherent, solvent-resistant sealer composition in elongate film form adherently supported on a thin flexible protective carrier web, said film being the in situ cured product of a self-curing plastic mass comprising 100 parts by weight of liquid polyalkylene polysulfide polymer having thiol terminals, about 0.2–1.5 parts of maleic anhydride, about 6 parts of cumene hydroperoxide, and about 1.1 parts of benzyl dimethylamine.

12. The method of making a permanently flexible, tough, strong, adherent, solvent-resistant sealer product capable of adhering to aluminum panels as a pressure-resistant and solvent-resistant sealer strip, comprising: blending together in a heavy, viscous, self-curing, plastic mass, ingredients comprising 100 parts by weight of liquid polyalkylene polysulfide polymer having thiol terminals, about 0.2–1.5 parts of maleic anhydride, about 6 parts of cumene hydroperoxide, and about 1.1 parts of benzyl dimethylamine; plastically deforming said mass into a thin uniform layer adherently supported on a thin flexible protective carrier web; and permitting said layer to cure.

13. An article having a leak-proof, mechanically held, metal-to-metal seam, comprising metal faying surfaces held in position by external mechanical retaining means and separated by an intervening thin film conformed and adhered to each of said faying surfaces and being a permanently flexible, tough, strong, adherent, solvent-resistant and pressure-resistant cured thin film of a self-curing plastic mass comprising 100 parts by weight of liquid polyalkylene polysulfide polymer having thiol terminals, about 0.2–1.5 parts of maleic anhydride, about 6 parts of cumene hydroperoxide, and about 1.1 parts of benzyl dimethylamine.

References Cited in the file of this patent

UNITED STATES PATENTS

| 225,091 | Allerton | Mar. 2, 1880 |
| 850,747 | Giles et al. | Apr. 16, 1907 |
| 2,406,260 | Ryden | Aug. 20, 1946 |
| 2,452,083 | Te Grotenhuis | Oct. 26, 1948 |
| 2,460,181 | Marshall | Jan. 25, 1949 |
| 2,466,963 | Patrick et al. | Apr. 12, 1949 |
| 2,631,994 | Te Grotenhuis | Mar. 17, 1953 |
| 2,727,876 | Iler | Dec. 20, 1955 |

FOREIGN PATENTS

| 618,449 | Great Britain | Feb. 22, 1949 |
| 202,999 | Australia | Aug. 2, 1956 |